United States Patent
Buzzell et al.

(10) Patent No.: US 8,175,927 B2
(45) Date of Patent: May 8, 2012

(54) E-COMMERCE BASED METHOD AND SYSTEM FOR MANUFACTURER HOSTING OF VIRTUAL DEALER STORES AND METHOD FOR PROVIDING A SYSTEMIZATION OF MACHINE PARTS

(76) Inventors: Thomas T Buzzell, East Peoria, IL (US); Daniel T Driscoll, Peoria, IL (US); Richard I Hartman, Peoria, IL (US)

( * ) Notice: Subject to any disclaimer, the term of this patent is extended or adjusted under 35 U.S.C. 154(b) by 696 days.

(21) Appl. No.: 12/213,227

(22) Filed: Jun. 17, 2008

(65) Prior Publication Data

US 2008/0262947 A1 Oct. 23, 2008

Related U.S. Application Data

(62) Division of application No. 09/648,656, filed on Aug. 25, 2000, now Pat. No. 7,395,223.

(60) Provisional application No. 60/193,871, filed on Mar. 31, 2000.

(51) Int. Cl.
G06Q 30/00 (2006.01)
G06F 3/048 (2006.01)

(52) U.S. Cl. .......................................... 705/26; 715/764
(58) Field of Classification Search .................... 705/26; 715/764
See application file for complete search history.

(56) References Cited

U.S. PATENT DOCUMENTS

| | | | |
|---|---|---|---|
| 4,799,156 A | 1/1989 | Shavit et al. | |
| 5,063,506 A | 11/1991 | Brockwell et al. | |
| 5,117,354 A | 5/1992 | Long et al. | |
| 5,216,612 A * | 6/1993 | Cornett et al. | 700/96 |
| 5,450,317 A | 9/1995 | Lu et al. | |
| 5,528,490 A * | 6/1996 | Hill | 717/168 |
| 5,694,551 A | 12/1997 | Doyle et al. | |
| 5,710,887 A * | 1/1998 | Chelliah et al. | 705/26.62 |
| 5,758,327 A | 5/1998 | Gardner et al. | |
| 5,784,565 A | 7/1998 | Lewine | |
| 5,806,046 A | 9/1998 | Curran et al. | |
| 5,839,112 A * | 11/1998 | Schreitmueller et al. | 705/4 |
| 5,860,068 A * | 1/1999 | Cook | 705/26.81 |
| 5,877,961 A * | 3/1999 | Moore | 700/180 |
| 5,884,309 A * | 3/1999 | Vanechanos, Jr. | 1/1 |
| 5,890,137 A | 3/1999 | Koreeda | |
| 5,914,878 A | 6/1999 | Yamamoto et al. | |
| 5,933,356 A * | 8/1999 | Rostoker et al. | 703/15 |
| 5,933,814 A | 8/1999 | Rosenberg | |
| 5,940,807 A | 8/1999 | Purcell | |
| 5,946,695 A * | 8/1999 | Hinrichs et al. | 1/1 |
| 5,960,411 A | 9/1999 | Hartman et al. | |
| 5,970,469 A | 10/1999 | Scroggie et al. | |

(Continued)

OTHER PUBLICATIONS http://web.archive.org/web/*/cat.com, <retrieved via WayBackMachine.org, retrieved on Mar. 5, 2007>, latest date relied on Dec. 12, 1998.

(Continued)

Primary Examiner — Matthew Gart
Assistant Examiner — Ashford S Hayles

(57) ABSTRACT

An e-commerce based method for requesting information and purchasing products from a dealer through a manufacturer is disclosed. This method and system includes sending a request for detailed dealer information to a manufacturer server system using a client system and displaying real-time detailed dealer information on the client system based on the request, the real-time detailed dealer information received from the manufacturer server system, the manufacturer server system accessing the real-time detailed dealer information from a remote dealer server system via a middleware application system.

24 Claims, 14 Drawing Sheets

U.S. PATENT DOCUMENTS

| | | | | |
|---|---|---|---|---|
| 5,970,472 A * | 10/1999 | Allsop et al. | | 705/26.81 |
| 5,970,475 A * | 10/1999 | Barnes et al. | | 705/26.35 |
| 5,974,395 A | 10/1999 | Bellini et al. | | |
| 6,009,413 A | 12/1999 | Webber et al. | | |
| 6,014,644 A | 1/2000 | Erickson | | |
| 6,029,142 A | 2/2000 | Hill | | |
| 6,041,310 A | 3/2000 | Green et al. | | |
| 6,044,356 A | 3/2000 | Murthy et al. | | |
| 6,115,642 A | 9/2000 | Brown et al. | | |
| 6,119,102 A | 9/2000 | Rush et al. | | |
| 6,167,383 A * | 12/2000 | Henson | | 705/26.5 |
| 6,263,317 B1 | 7/2001 | Sharp et al. | | |
| 6,282,517 B1 | 8/2001 | Wolfe et al. | | |
| 6,487,479 B1 * | 11/2002 | Nelson | | 701/29 |
| 6,557,002 B1 * | 4/2003 | Fujieda et al. | | 1/1 |
| 6,587,827 B1 | 7/2003 | Hennig et al. | | |
| 6,606,603 B1 * | 8/2003 | Joseph et al. | | 705/26.8 |
| 6,851,094 B1 * | 2/2005 | Robertson et al. | | 716/129 |
| 6,901,377 B1 * | 5/2005 | Rosenfeld et al. | | 705/26.35 |
| 6,922,676 B2 | 7/2005 | Alnwick | | |
| 2002/0123812 A1 * | 9/2002 | Jayaram et al. | | 700/98 |

OTHER PUBLICATIONS http://web.archive.org/web/*/www.wineweb.com, <retrieved via WayBackMachine.org, retrieved on Sep. 4, 2007>, latest date relied on Feb. 22, 1999.

Peterson, A., "Web Gateway Sites Keep Growing—Be a Portal, or Just Look Like One," *Wall Street Journal*, Brussels, Dec. 11, 1998.

* cited by examiner

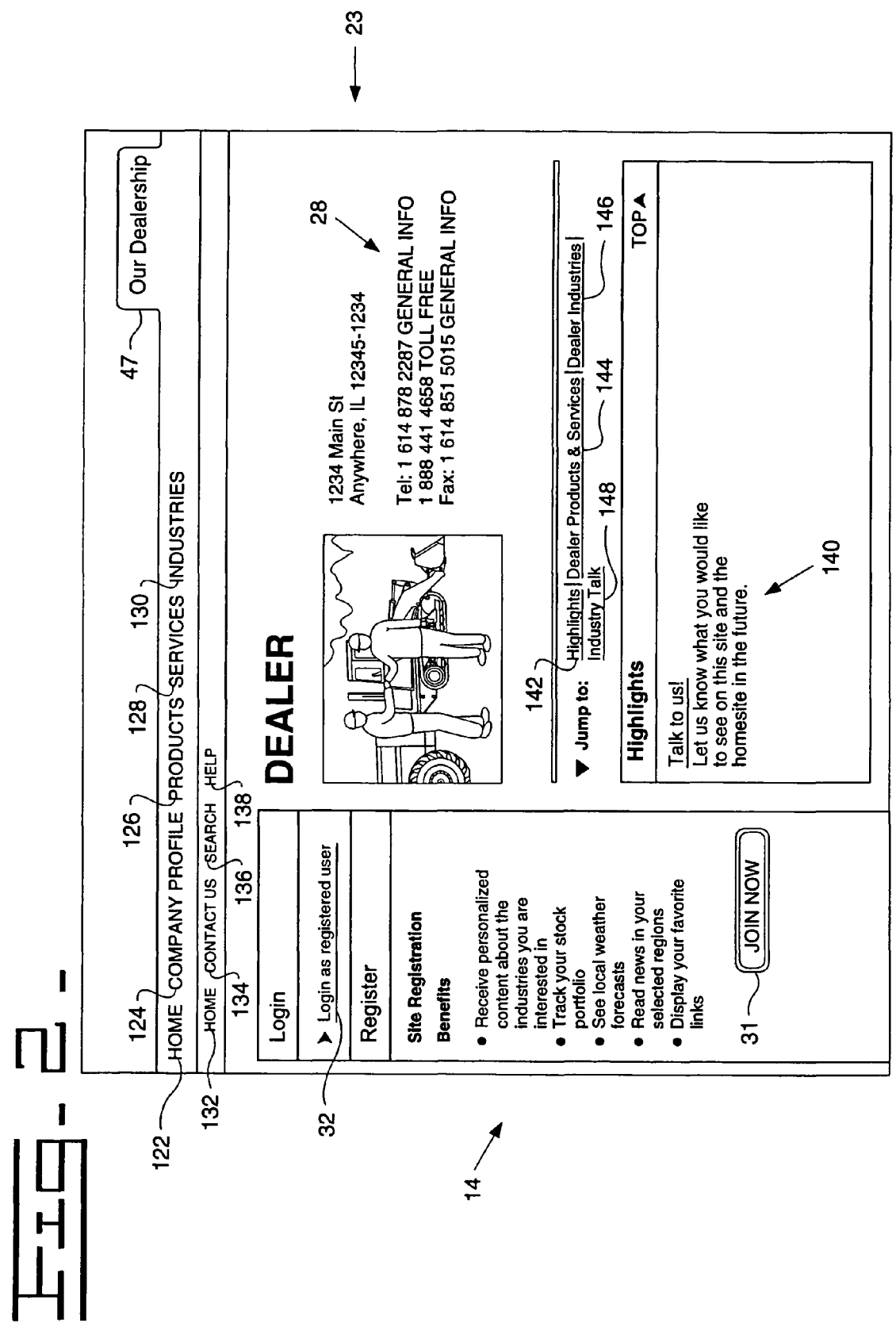

FIG-3

Registration

| Your Profile | Personalized Information | Your Equipment |

Customize Your Dealer Storefront

Please indicate the items below that interest you. Only selected items will appear on your Dealer Storefront.

INDUSTRIES
Please select the Industries that interest you. Featured content such as articles and links will be personalized for you based on the inputs you select.

36

- ☐ Agriculture — 220
- ☐ Construction — 222
- ☐ Engine (EPG) — 224
- ☐ Engine (Industrial OEM / Locomotive) — 226
- ☐ Engine (Marine) — 228
- ☐ Engine (Petroleum) — 230
- ☐ Engine (Truck) — 232
- ☐ Forestry — 234
- ☐ Heavy Construction — 236
- ☑ Industrial — 238
- ☑ Mining — 240
- ☐ Quarry / Aggregates — 242
- ☑ Waste — 244

WEATHER
Select regions and cities for which you would like to see weather forecasts.

37

US City:
1. ◉ Saint Paul, MN
2. ◉ Bellevue, WA
3. ◉ New York, NY

OR International City:
1. ○ — Select —
2. ○ — Select —
3. ○ — Select —

STOCKS

38

Stock Symbols
1. ○ [     ]
2. ○ [     ]
3. ○ [     ]

LINKS: 39

1. ○ [     ]
3. ○ [     ]

[SUBMIT] — 33

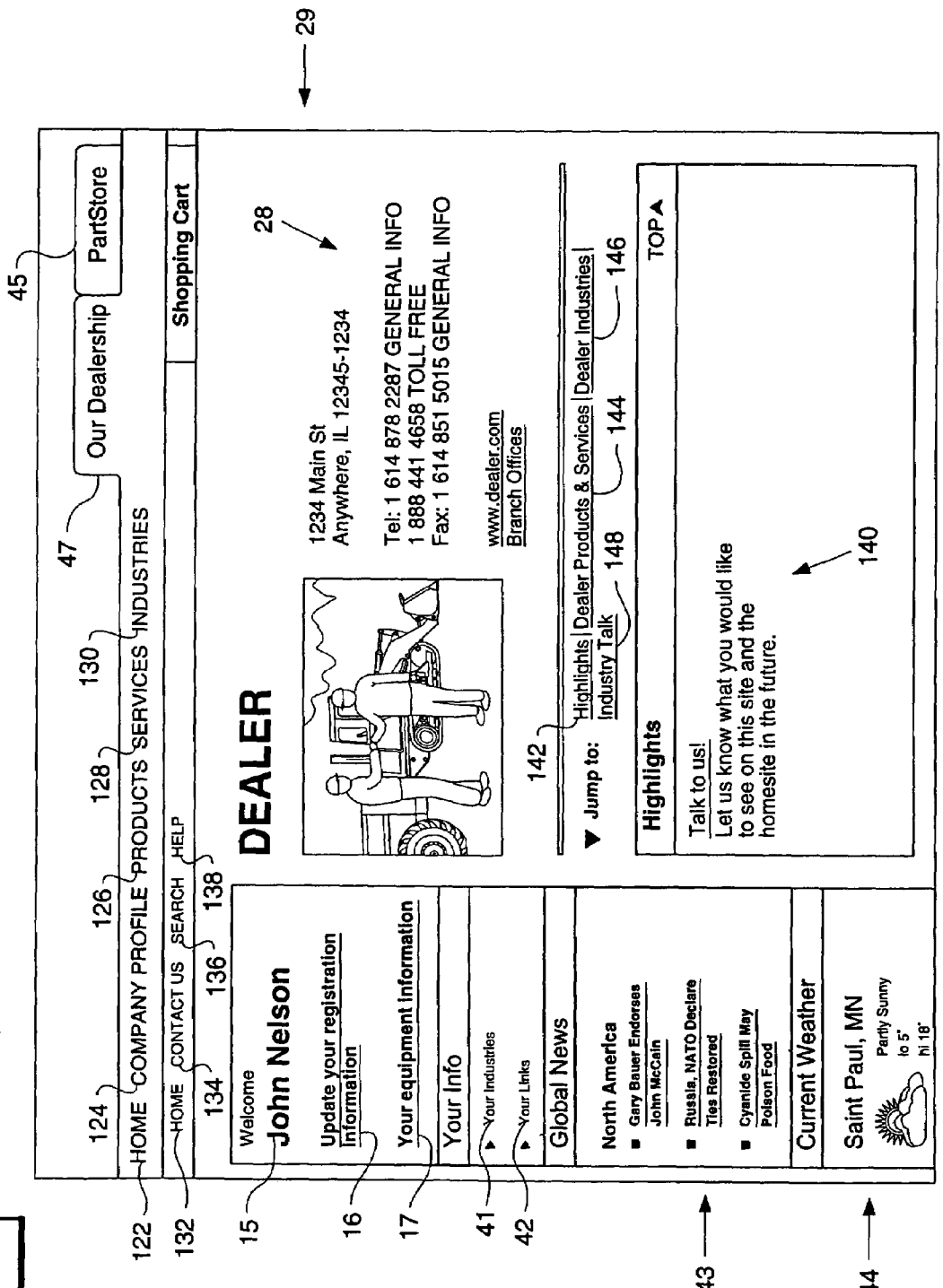

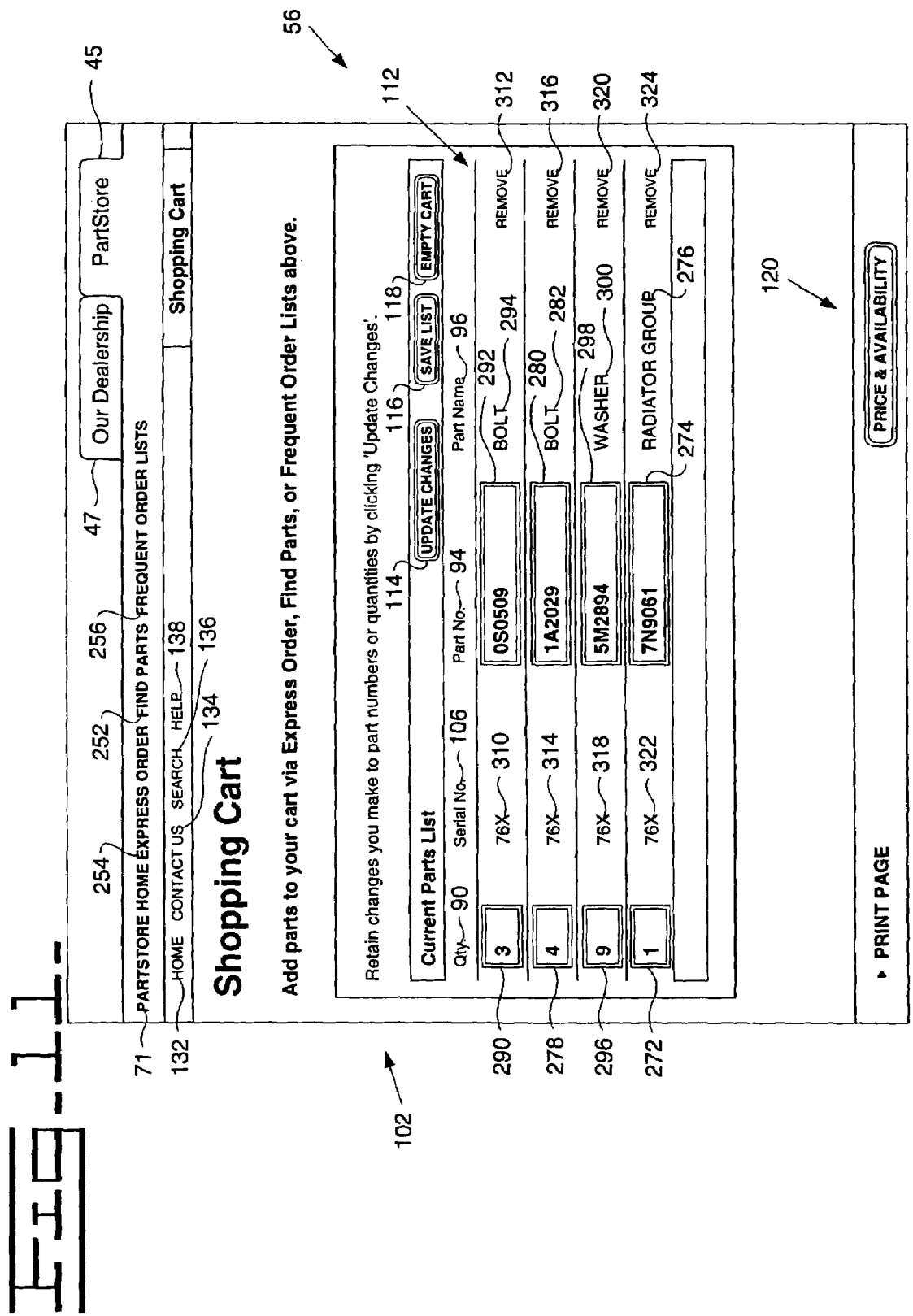

PartStore Checkout

◂ Shopping Cart

Parts List - Pricing & Availability

Order Details

332 — Customer ID: 20000
334 —
336 — Tracking Serial Number:
338 — Quote Number: 03Q000005
(Use this number when communicating with us to discuss this quote)

Parts List — 344

| Serial No. 94 | Part No. | Qty. 90 | Part Name* 96 | Availability 346 | Unit Price 348 | Price 350 |
|---|---|---|---|---|---|---|
| 292 | 0S-0509 | 3 — 290 | Bolt — 294 | Peoria - 1 day — 352 | 5.60 — 354 | 16.80 — 356 |
| 280 | 1A-2029 | 4 — 278 | Bolt — 282 | Moline - 1 day — 358 | 64.81 — 360 | 259.24 — 362 |
| 298 | 5M-2894 | 9 — 296 | Washer — 300 | Moline - 1 day — 364 | 2.49 — 366 | 22.41 — 368 |
| 274 | 7N-9061 | 1 — 272 | Radiator Group | Peoria - 1 day — 370 | 264.81 — 372 | 264.81 — 374 |

276 — TOTAL** 563.26 — 375

340 —

▶ Send Email Order — 342
Send order to us via email with special instructions. We will contact you about this order.

[CANCEL ORDER] — 376    [CONTINUE] — 377

Note:
† Indicates this part is non-returnable
* Part Names shown above may vary from the names shown in the Shopping Cart
** This quote does not include taxes, shipping and handling charges

Order Summary — PartStore Checkout

Order Details

- Quote Number: 03Q000005
- Customer ID: 20000
- Tracking Serial Number:
- Purchase Order Number: 12345

Shipping Details

Shipping Address:
John Nelson
C/O ACME CONSTRUCTION
5555 W. ELMWOOD AVENUE
P.O. BOX 2000
PEORIA, IL 61604

Shipping Instructions:

Shipping Mode: none

Parts List

| Serial No. | Part No. | Qty. | Part Name* | Radiator Group | Availability | Unit Price | Price |
|---|---|---|---|---|---|---|---|
| | 0S-0509 | 3 | Bolt | | Peoria - 1 day | 5.60 | 16.80 |
| | 1A-2029 | 4 | Bolt | | Moline - 1 day | 64.81 | 259.24 |
| | 5M-2894 | 9 | Washer | | Moline - 1 day | 2.49 | 22.41 |
| | 7N-9061 | 1 | | Radiator Group | Peoria - 1 day | 264.81 | 264.81 |
| | | | | | | TOTAL** | 563.26 |

CANCEL ORDER    PLACE ORDER

Note:
† Indicates this part is non-returnable
* Part Names shown above may vary from the names shown in the Shopping Cart
** This quote does not include taxes, shipping and handling charges

E-COMMERCE BASED METHOD AND SYSTEM FOR MANUFACTURER HOSTING OF VIRTUAL DEALER STORES AND METHOD FOR PROVIDING A SYSTEMIZATION OF MACHINE PARTS

This application is a divisional of application Ser. No. 09/648,656, filed Aug. 25, 2000, now U.S. Pat. No. 7,395,223 now allowed, which claims the benefit of prior provisional patent application Ser. No. 60/193,871 filed Mar. 31, 2000.

TECHNICAL FIELD

The present invention relates generally to electronic commerce ("e-commerce") systems on the Internet and, more particularly, to a system and method whereby a manufacturer hosts a virtual dealer store to provide real-time dealer-level inventory, pricing, and sales to a consumer as well as providing the consumer with a systemization of machine parts.

BACKGROUND ART

The Internet is a convenient medium by which consumers can have immediate access to complete product and service information along with the ability to purchase those products and services. In the past, to provide e-commerce capabilities, many dealers created virtual stores on their own dealer server systems. Consequently, extensive upgrades and complete infrastructure overhauls to their back-end systems were often necessary. In addition, it was very difficult for particular consumers to locate the nearest and most cost-effective dealer. Moreover, because many consumers relate to a particular brand or manufacturer of a product, rather than the name of a specific dealer, some consumers are unable to locate dealers on the Internet selling the desired product, not to mention the nearest or most cost-effective dealer.

Furthermore, some manufacturers solely created and completely operated virtual stores for dealers thereby creating a necessity to separately synchronize the manufacturer's virtual store data with each corresponding dealer. Here, again, many back-end system upgrades and overhauls are required by the manufacturer and dealer. The costs associated with these upgrades and overhauls exponentially increase with each additional dealer the manufacturer connects to its virtual store due to continuous data synchronization requirements as well as maintenance of all manufacturer and dealer back-end systems. Moreover, real-time data regarding a particular dealer may be non-existent, unavailable, or inoperative with this configuration due to synchronizing delays with each dealer.

Consequently, past back-end configurations fail to provide immediate, low-cost, and secure access to virtual stores and electronic commerce systems without complete infrastructure overhauls. Some companies simply cannot afford to go back to the drawing board and completely revise the architecture of critical systems because they greatly depend upon existing infrastructure. What is needed, then, is a method and system for a virtual store which is accessible from a manufacturer's website that defines a configuration and structure allowing use of existing system infrastructure of a dealer while providing real-time dealer specific information (pricing, availability, descriptions) to the consumer without interfacing the consumer directly with the older infrastructure and systems.

Additionally, a front-end presentation of a systemization of machine parts so that consumers may properly and quickly select among various machine parts is absent in the industry.

Currently, machine parts are sold in person or over the phone with the aid of considerable cataloging documents requiring significant resources and time. In instances where part numbers or components are unknown, the mere determination of the necessary machine parts may take even longer. This may be much more time than a consumer is willing to spend if he either only needs an individual machine part or group of machine parts. It would be helpful to have a means for consumers to select specific groups or individual parts of machine parts for purchase, or to assemble only the required individual parts within a group of machine parts, without the aid of another human being or physical document. In addition, the number of different kinds of machine parts for a single machine often makes it confusing for consumers to know which specific parts best meet their needs. Consequently, a front-end systemization of machine parts which allow consumers to properly and quickly select among various machine parts having different individual parts, groups, components, and systems is necessary.

The present invention is directed to overcoming one or more of the problems set forth above.

DISCLOSURE OF THE INVENTION

In one aspect of this invention, an e-commerce based method for requesting information and purchasing products from a dealer through a manufacturer is disclosed. The method includes the steps of sending a request for detailed dealer information to a manufacturer server system using a client system, displaying real-time detailed dealer information on the client system based on the request, receiving the real-time detailed dealer information from the manufacturer server system, and accessing the real-time detailed dealer information with the manufacturer server system from a remote dealer server system via a middleware application system.

In another aspect of this invention, an e-commerce based system for requesting information and purchasing products from a dealer through a manufacturer is disclosed. The system includes a client system, a manufacturer server system in communication with the client system, the manufacturer server system having a middleware application system, and a remote dealer server system in communication with the middleware application system to provide real-time detailed dealer information to the manufacturer server system via the middleware application system with the manufacturer server system sending the real-time detailed dealer information to the client system for displaying.

BRIEF DESCRIPTION OF THE DRAWINGS

For a better understanding of the present invention, reference may be made to the accompanying drawings in which:

FIG. 2 illustrates an exemplary dealer's home page interface at a virtual dealer store;

FIG. 3 illustrates a personalized data interface screen utilized in a registration process at a virtual dealer store;

FIG. 4 illustrates a dealership interface screen providing links to other aspects of the virtual dealer store;

FIG. 11 illustrates a "shopping cart" interface screen utilized by the consumer in ordering parts from the dealer;

FIG. 12 illustrates a "price list-pricing and availability" interface screen utilized by the consumer in ordering parts from the dealer;

FIG. 13 illustrates an "order summary" interface screen utilized by the consumer in ordering parts from the dealer.

BEST MODE FOR CARRYING OUT THE INVENTION

Figure 1:
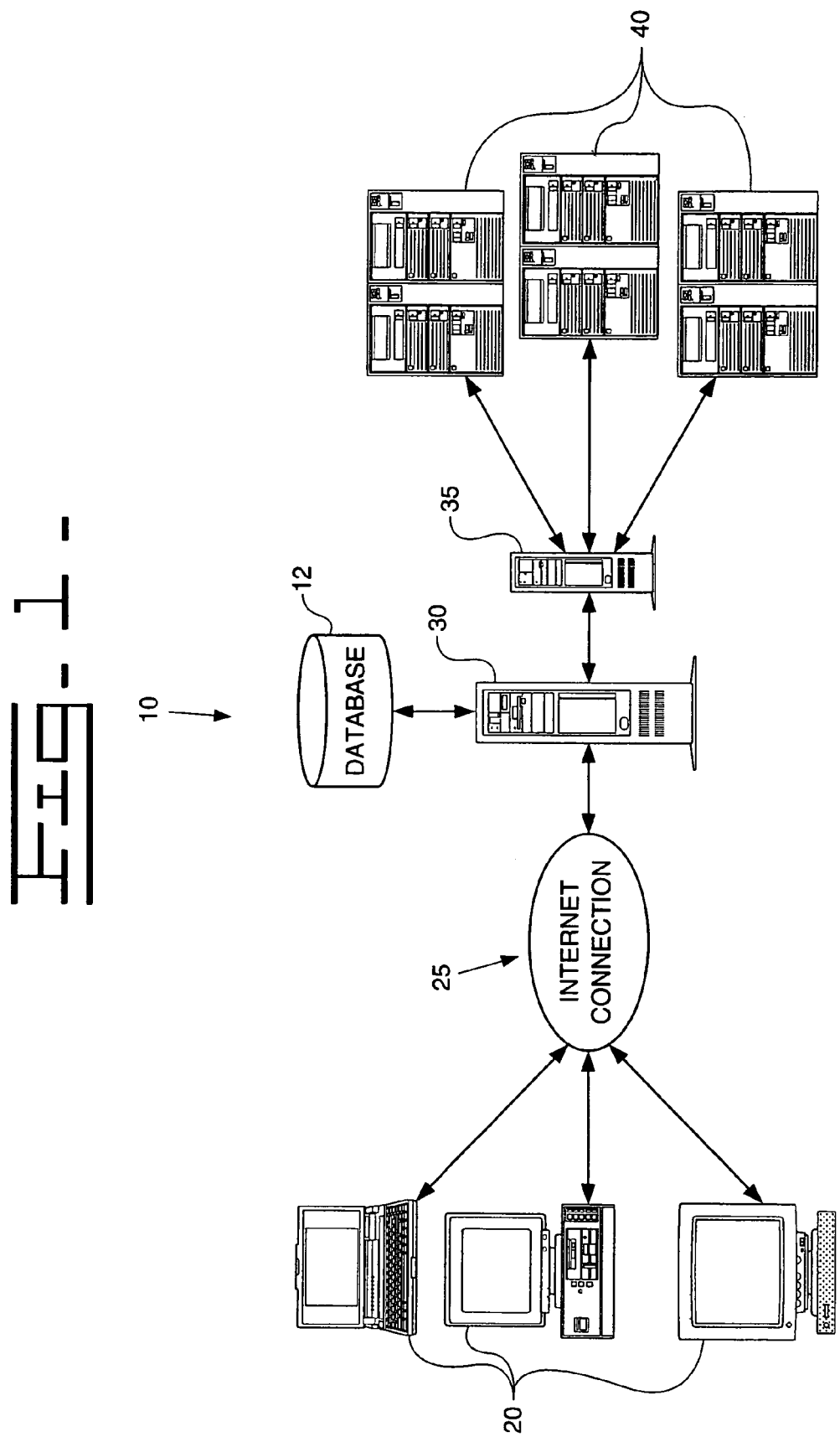
FIG. 1 illustrates a diagrammatic representation of the e-commerce system in accordance with the present invention, illustrating the major participants and primary electronic transactions that flow in the use of the system.

A method and apparatus for providing a form of e-commerce via the Internet are described. In the following detailed description numerous specific details are set forth in order to provide a thorough understanding of the invention. However, it will be understood by those skilled in the art that the present invention may be practiced without these specific details. For example, the invention is not limited in scope to any specific combination of hardware circuitry and software, software language, server environment, electronic communications network, or to any particular source for instructions executed by the computer system. In other instances, well-known methods, procedures, components, and circuits have not been described in detail so as not to obscure the present invention.

The e-commerce virtual store system in accordance with the present invention is an electronic information and sales system built from a combination of off-the-shelf hardware and software packages and custom software. It is intended to allow consumers to directly interact with dealers through a manufacturer, rather than through purchasing agents or solely through the dealers themselves. One aspect of the present invention includes a technique by which a consumer can visit a manufacturer's website and purchase and receive information regarding various products and services of a particular dealer. These and other aspects of the present invention will be described below in greater detail.

In one embodiment, the present invention is carried out in a computer system by a microprocessor executing sequences of instructions contained in a memory. More specifically, execution of the sequences of instructions causes the microprocessor to perform steps of the present invention, which are described below. The instructions may be loaded into RAM for execution by the microprocessor from a ROM or other storage device. Also, the instructions may be received by the computer system via a network from another computer system. In other embodiments, hardwired circuitry may be used in place of, or in combination with, software instructions to implement the present invention.

In the present invention, there is a connection via the Internet between a client computer system and a web server system. The client system executes a web browser software application which allows the client system to access Hypertext Markup Language ("HTML") web pages and other data on various web servers. Because the user of the client system may be a consumer wishing to purchase parts or products, the web server preferably includes a shopping cart software application for allowing the consumer to purchase these products, or else, the server may provide a hypertext link to another server which executes such software.

Furthermore, the client system of the present invention preferably includes a bus, a processor coupled with the bus for processing information, and a main memory, such as RAM or other dynamic storage device, coupled to the bus for storing information and instructions to be executed by the processor. The client system may further include ROM or other static storage device coupled to the bus for storing static information and instructions for the processor. A storage device, such as a magnetic disk or optical disk is also provided and coupled to the bus for storing information and instructions. The client system may also include a communication device and various input/output devices, such as monitors, keyboards, pointing devices, or printers, both being coupled to the bus. The communication device provides the client system with a connection to the Internet and may be a device suitable for such purpose, such as a telephone modem or ISDN adapter. It is understood that other details regarding the client computer system and architecture have been omitted so as to not obscure the present invention.

Referring now to FIG. 1, the e-commerce virtual store system of the present invention is generally indicated by numeral 10. The e-commerce virtual store system 10 allows a consumer or user to inquire about dealer-level inventory, pricing, sales information, or to purchase an item on-line, among other features.

In the present invention, the consumer's computer is a client system 20 and includes web browsing software. Using the web browsing software and Internet connection 25 a consumer can navigate through the Internet to the manufacturer's website or directly to a dealer's website on the manufacturer's server system 30. Notably, if the consumer arrives at the manufacturer's website first, the consumer can easily access any particular dealer's website because, in the preferred embodiment, the manufacturer's website includes all of the dealer's capability to provide such information and purchasing capabilities. Initially, the dealer's website home page interface screen, generally indicated by numeral 23 in FIG. 2, is shown with dealer identification information 28. The next step for the consumer is to either register through registration button 31 or to log-on as a registered consumer through log-on hyperlink 32. To encourage registration for non-registered consumers, the advantages of registration are described and summarized, as generally indicated by numeral 14. The log-on hyperlink 32, after entering a proper username and password, will relocate the consumer to a screen similar to the one depicted by numeral 29 in FIG. 4. During initial registration through the registration button 31, the consumer has an opportunity to create and individualize a personal webpage with personalized data on the personalized data interface screen 27, as shown on FIG. 3. The consumer can select the specific type of industry news that he or she is interested in through an industry news input 36. Illustrative, but nonlimiting industries include: Agriculture 220; Construction 222; Engine (EPG) 224; Engine (Industrial OEM/Locomotive) 226; Engine (Marine) 228; Engine (Petroleum) 230; Engine (Truck) 232; Forestry 234; Heavy Construction 236; Industrial 238; Mining 240; Quarry/Aggregates 242; and Waste 244. In this illustrative example, a checked input is provided to Industrial 238, Mining 240 and Waste 244. In addition, the consumer can select the specific location for weather for a series of U.S. or International cities through a weather input 37. Furthermore, the consumer can track specific stocks or investments through a stock input 38. Hyperlinks to the consumer's favorite websites are also available through a hyperlinks input 39. After all of the personalized data is inputted, the consumer will then submit the information through a submit button 33.

The consumer is then directed to a dealer interface screen that is generally indicated by numeral 29 in FIG. 4 and can be re-accessed by tab 47 having the exemplary title of "Our Dealership." The dealer identification information 28 is again present on this dealer interface screen 29. The consumer name 15 is also present as well as a registration update link 16 that directs the consumer back to the personalized data interface screen 27 in FIG. 3 as well as a consumer equipment listing link 17 that directs the consumer back to a screen listing the consumer's equipment (not shown). Also, there is an industry news link 41 and a link for the consumer's favorite hyperlinks 42 to other Internet websites. Furthermore, there is a general local, national and international news links 43 as well as the current weather conditions link 44. In this illustrative example, there is a first tier of buttons on the dealer interface screen 29 that includes a "Home" button 122, a "Company Profile" button 124 that provides a link to specific dealer information (not shown), a "Products" button 126 that provides a link to specific products offered by that particular dealer (not shown), a "Services" button 128 that provides a link to specific services offered by that particular dealer (not shown), and an "Industries" button 130 that provides a link to specific industries associated with that particular dealer (not shown).

There is an illustrative second tier of buttons located underneath the first tier of buttons described above. This includes another "Home" button 132 that directs the consumer to the manufacturer home page interface screen (not shown), a "Contact Us" button 134 that allows the consumers to send e-mail to the Dealer (not shown), a "Search" button 136 that allows the consumer to search the entire website and a "Help" button 138 that provides assistance to the consumer in utilizing the website. Contact Link 140 performs the same function as the "Contact Us" button 134. There are also a number of ancillary hyperlinks that include "Highlights" 142, "Dealer Products & Services" 144, "Dealer Industries" 146 and "Industry Talk" 148. All of these ancillary hyperlinks are self-explanatory and will direct the consumer to additional informational screens that are not shown.

Figure 5:
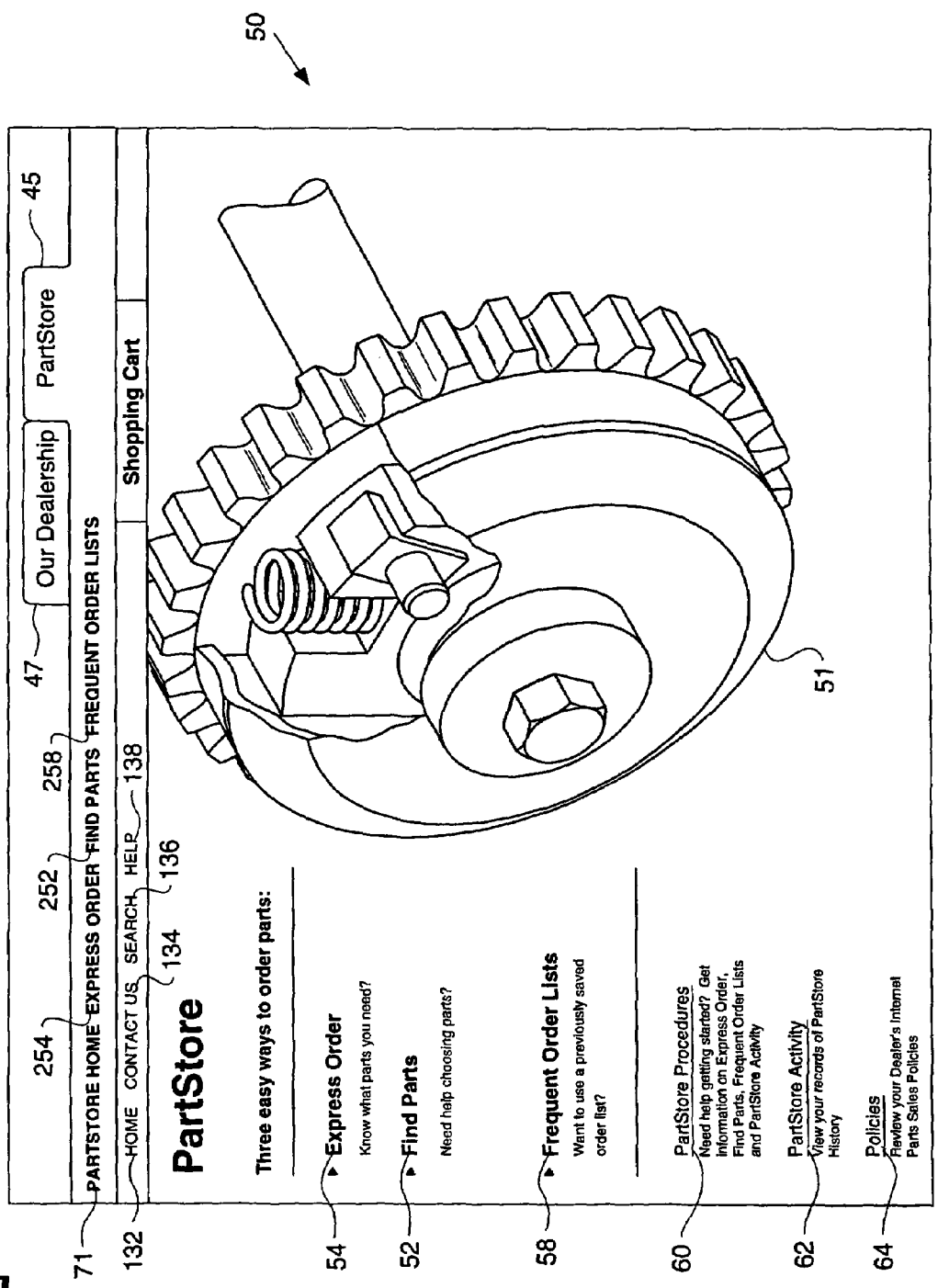
FIG. 5 illustrates a part ordering interface screen.

The consumer has the option of ordering parts directly from the dealer by selecting tab 45, which has the exemplary title of "PartStore". Upon selecting tab 45, the consumer is directed to a part ordering interface screen that is generally indicated by numeral 50, in FIG. 5, so that the consumer can order specific parts from the dealer. In the background, an example of a part is graphically displayed as indicated by numeral 51. A "PartStore Home" tab is indicated by numeral 71 and allows the consumer to return to this interface screen should it be desired.

The "Express Order" links, generally indicated by numerals 54 and 254, will direct the consumer to a shopping cart interface screen that is shown in FIG. 11 and generally indicated by numeral 56. The actual ordering of the part by the consumer will be described later.

The "Frequent Order Lists" links, generally indicated by numerals 58 and 258, will direct the consumer to a screen showing previously utilized part ordering lists (not shown). The "Part Store Procedures" link, generally indicated by numeral 60, will direct the consumer to a screen providing advice (not shown) on how to utilize the e-commerce virtual store system 10. The "Part Store Activity" link, generally indicated by numeral 62, will direct the consumer to a screen that will provide the consumer with the records (not shown) of their prior use of the e-commerce virtual store system 10. The "Policies" link, generally indicated by numeral 64, will direct the consumer to a screen that will provide the consumer with each respective Dealer's part sales policies (not shown).

Figure 6:
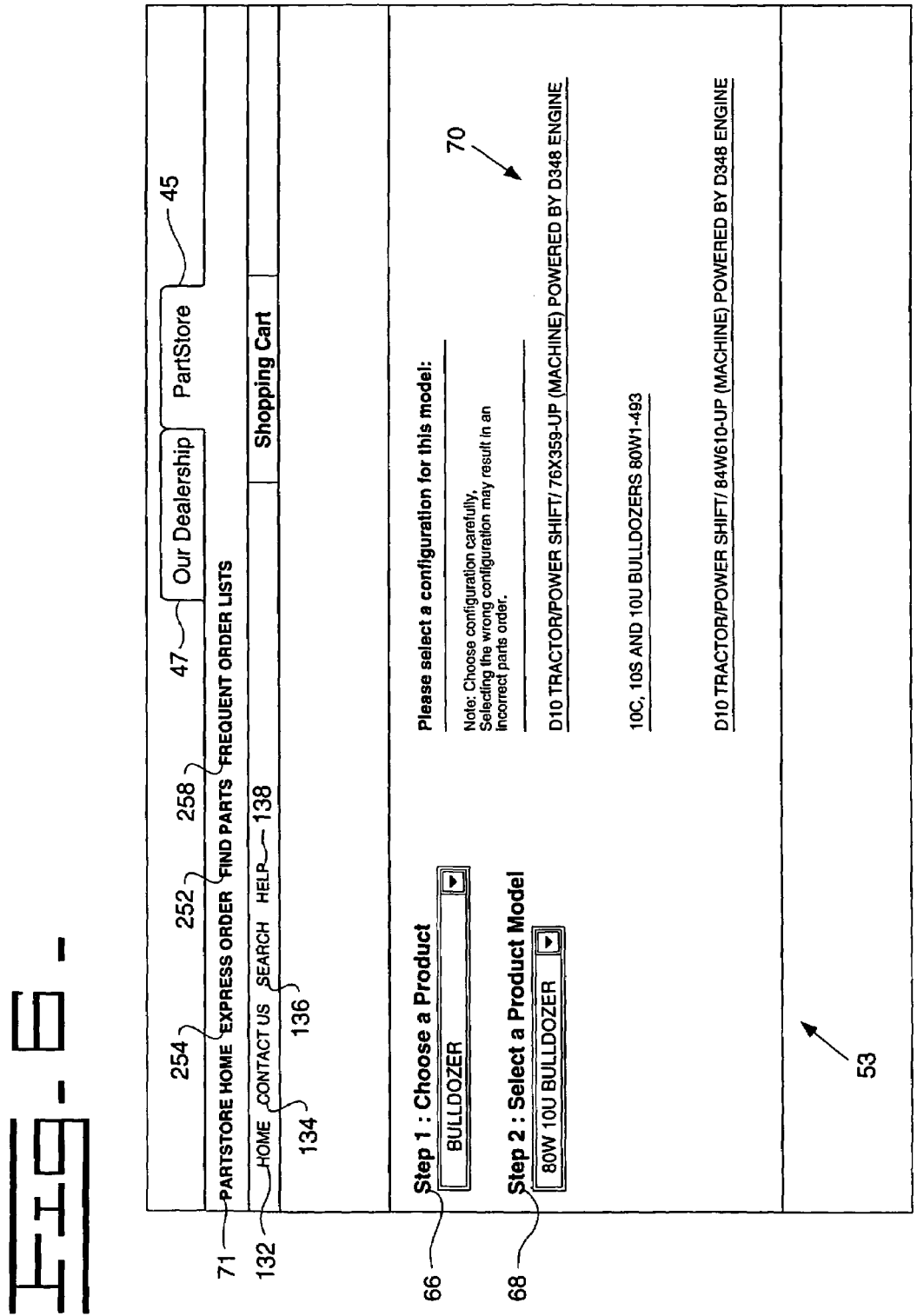
FIG. 6 illustrates a product type/product model/configuration types selection interface screen.
Figure 7:
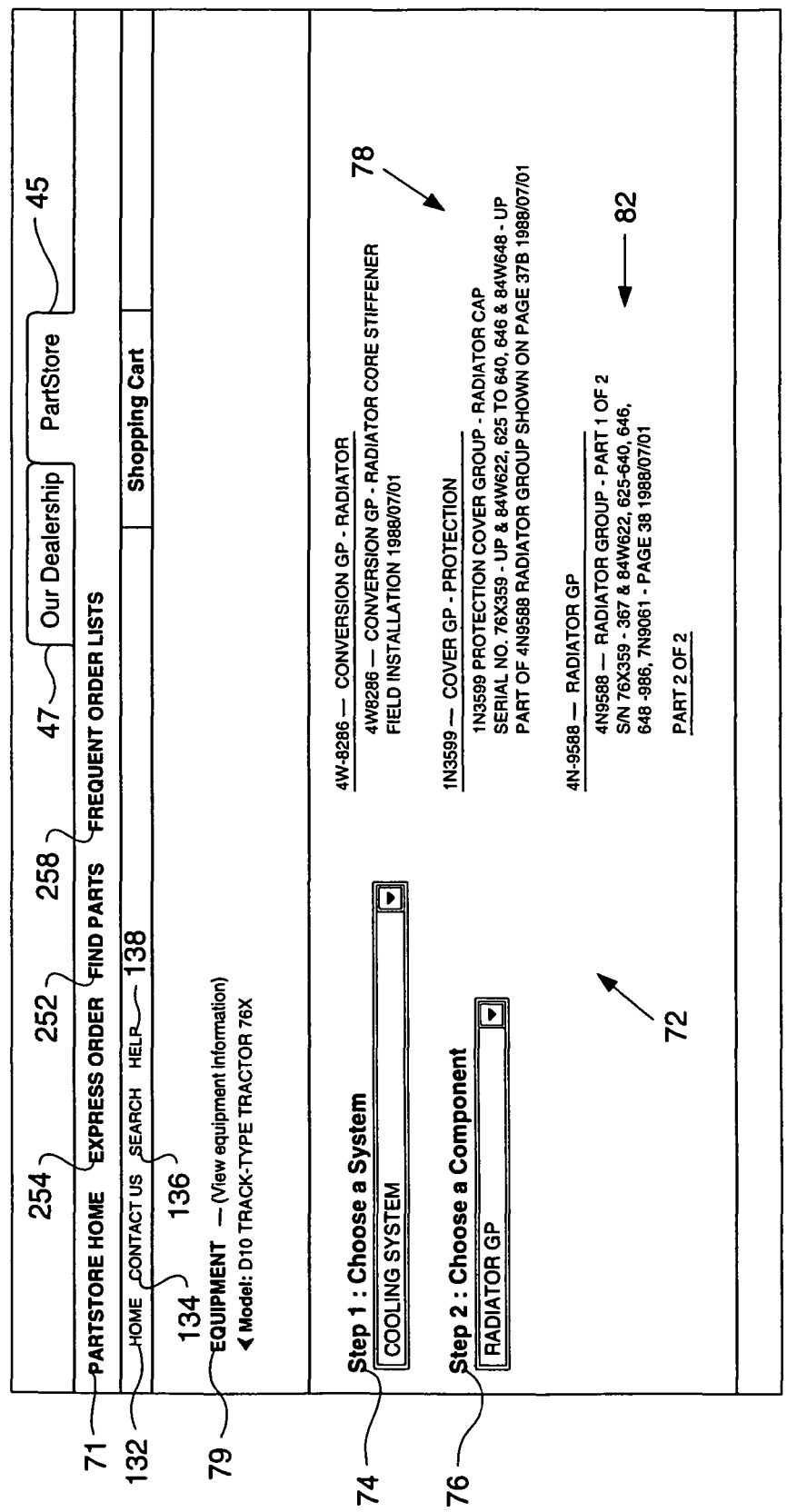
FIG. 7 illustrates a system component interface screen.

To subsequently use the systemization of machine parts within the virtual dealer store to purchase machine items, a consumer will then select the "Find Parts" links, generally indicated by numerals 52 and 252, thereby displaying a product type/product model/configuration interface such as that shown in FIG. 6 and generally indicated by numeral 53. The consumer can then directly order parts as hereinafter described in further detail. The manufacturer server system 30 then collects information regarding the machine for which the consumer desires further information for the ultimate objective of purchasing. In the preferred embodiment, the consumer enters, and the manufacture server system 30 collects, such machine information as product type 66 and product model 68. The resulting configuration types 70 are then displayed. After the specific configuration type 70 is selected by the consumer, the consumer is then directed to a system component interface screen as generally indicated by numeral 72 in FIG. 7.

Here the consumer, via the web browsing application, selects a system of machine parts from at least two available systems, as illustrated by "Step 1: Choose a System" 74 in FIG. 7. Based on the selected system, the consumer then selects, from at least two different components, a component of machine parts, as shown by "Step 2: Choose a Component" 76 in FIG. 7. Based on the selected component, the consumer then selects, from at least one group of machine parts, a group of machine parts 78, as shown on the right side of FIG. 7. A specific chosen group of machine parts is identified by numeral 82.

Figure 8:
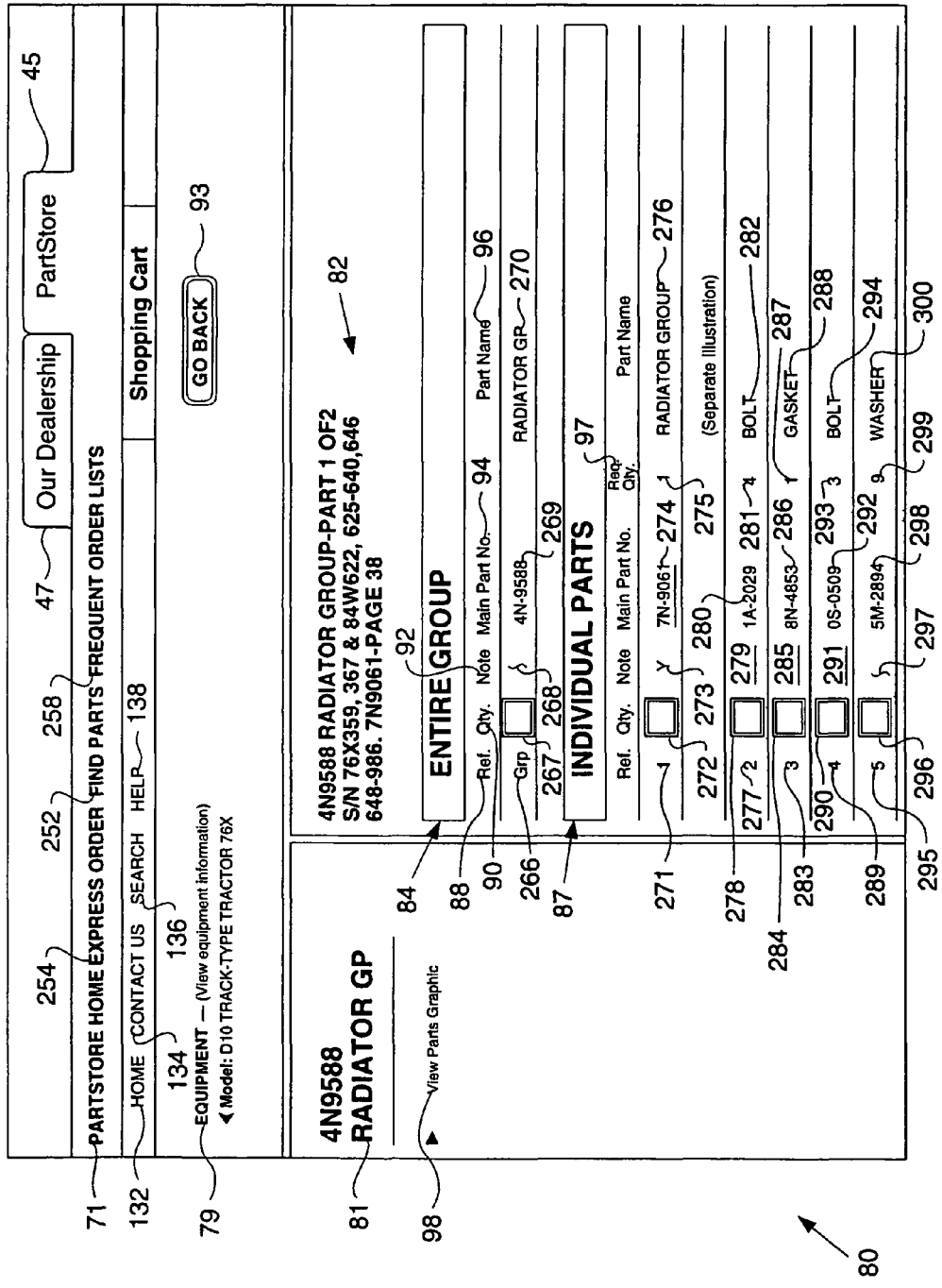
FIG. 8 illustrates a machine parts interface screen.
Figure 9:
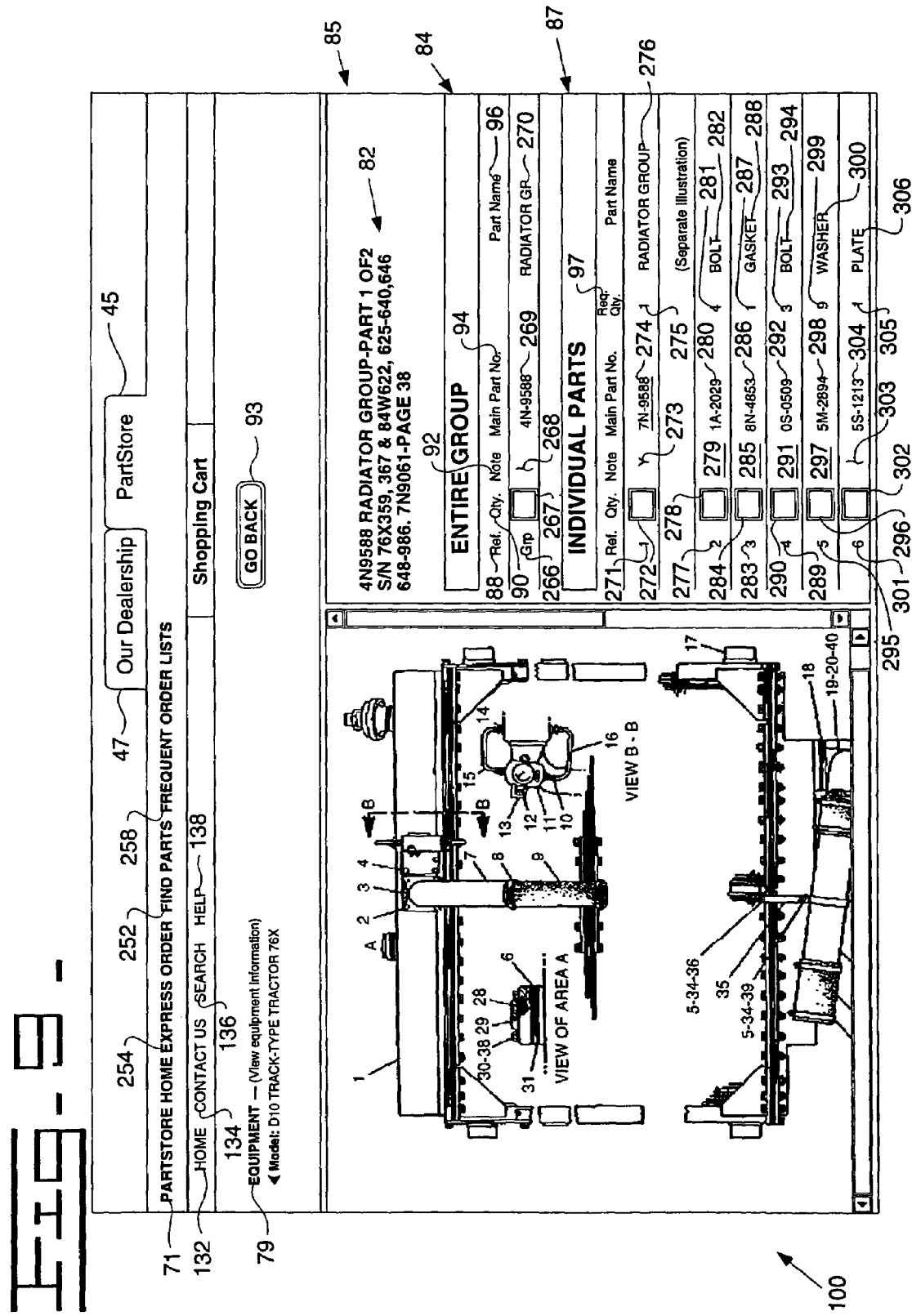
FIG. 9 illustrates the machine parts interface screen of FIG. 8 with a detailed schematic.

An equipment information link 79 will additionally direct the consumer to a screen providing more information regarding the selected equipment (not shown). After selection of one chosen group of machine parts 82, the consumer is directed to an exemplary machine parts interface screen, generally indicated by numeral 80, such as that shown in FIG. 8. Here, the description of the selected group of machine parts 82 and the name of the selected group of machine parts 81 are shown together. There are two main informational sections on this machine parts interface screen 80 with the chosen entire group of machine parts 84 and individual parts 87, which compose the group of machine parts, thereby allowing the consumer to inquire or purchase either an entire group of parts or select from the individual parts that constitute the entire group: There are five columns of information that include a Reference 88, Quantity 90, Note 92, Part No. 94, and Part Name 96. Reference 88 provides some designation to either the part or group. Quantity 90 allows the consumer to select a desired quantity and input this value. Note 92 notifies the consumer that there is a link that allows the consumer to access additional information by clicking on the part number. Part No. 94 identifies a specific part number in the system and, if underlined, provides a hyperlink for the consumer to access additional information screens (not shown) and Part Name 96 provides an associated descriptor for a part number. Under the individual parts 87 portion of the machine parts interface screen 80 is a column 97 labeled "Req. Qty." which indicates the quantity required to replace or fix the part indicated. There is also a "Go Back" button 93 that allows the consumer to return back to the previous interface screen. Furthermore, if the consumer desires to view schematic drawings of the selected entire group or individual parts of the machine, with corresponding reference numerals, the link "View Parts Graphic" 98 will display such information. Selecting such link 98 will display the examplary schematic screen interface found on FIG. 9 and generally indicated by reference numeral 85. The individual parts portion 87, in addition to displaying columns relating to part names, for example, illustrates reference numerals, as explained previously, which conveniently correspond to the schematic drawing 100 and further aid the consumer in quickly making the proper part selection.

This method of systemization, then, provides a quick and easy to understand explanation of the different systems, components, groups and individual parts that can be selected to remedy a machine part in need of repair or replacement. It also prevents delay and incorrect ordering of particular groups or individual parts of machine parts by eliminating human miscommunications and confusion between a dealer and consumer. The method further allows a consumer to order select individual parts without having to order an entire group of machine parts. Consequently, a consumer can more economically purchase a variety of different individual machine parts for his particular needs. This systemization also allows a consumer to select a small and more affordable quantity of individual parts. The present invention's method of providing a systemization of machine parts to a consumer, therefore, allows for easy, accurate, convenient, and quick selection of machine parts.

Figure 10:
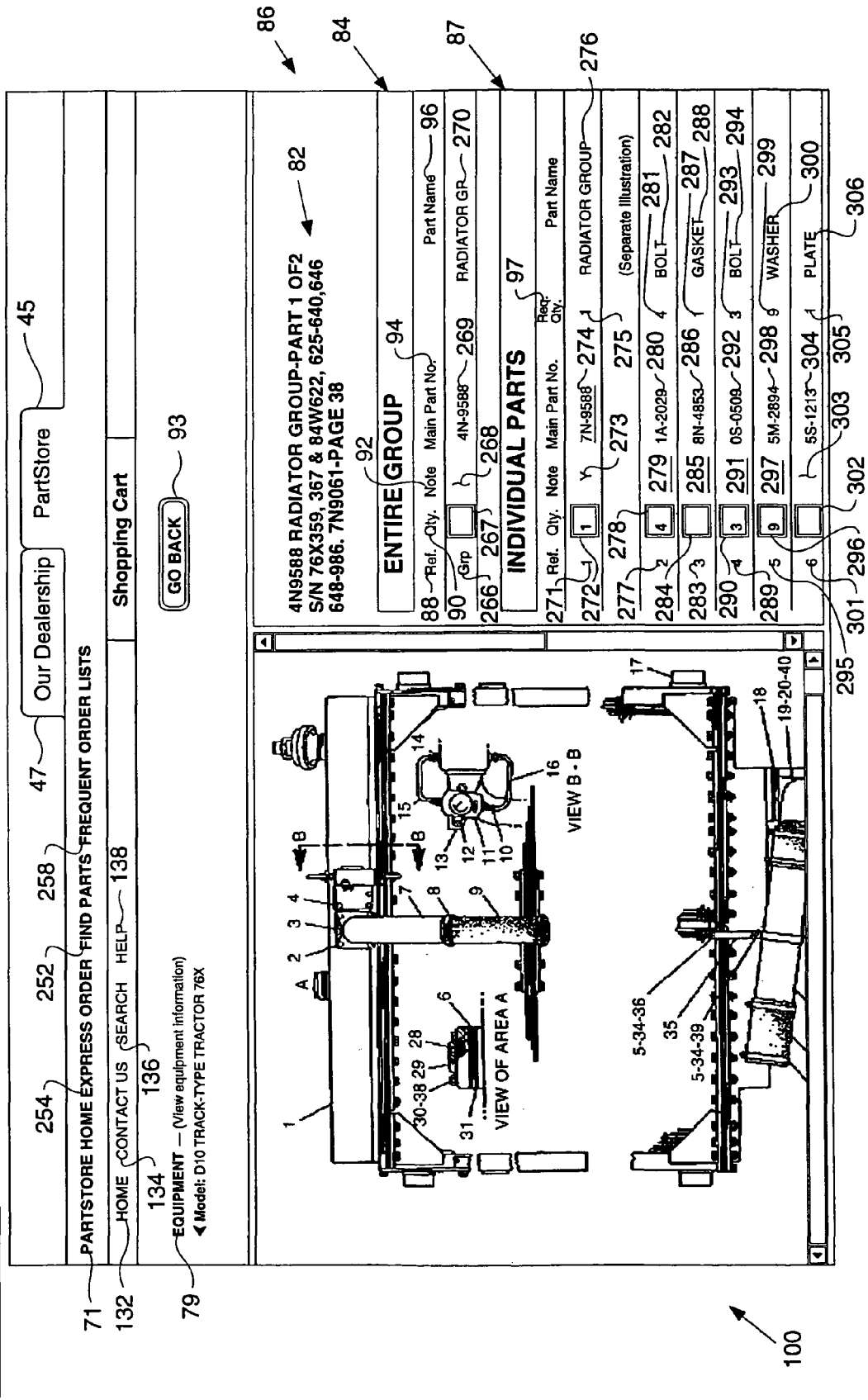
FIG. 10 illustrates the interface screen of FIG. 9 with selected parts.

After deciding whether a group and/or individual part(s) are desired, the consumer then selects the quantity of each group and/or individual part(s), as shown in FIG. 10. In this example, in the portion of the schematic screen interface 86 entitled entire group of machine parts 84, under the column entitled Reference 88, the designation "Grp" 266 appears, under the column entitled Quantity 90, the input 267 is blank, under the column entitled Note 92, the designation is blank 268, under the column entitled Part No. 94, the part number "4N-9599" is listed 269, and under the column entitled Part Name 96, the part name "RADIATOR GP" is listed 270.

In this example, in the portion of the schematic screen interface 86, in the individual parts portion 87, in the first row, under the column entitled Reference 88, the designation "1" appears 271, under the column entitled Quantity 90, the input 272 is the numeral "1", under the column entitled Note 92, the designation is "Y" for yes 273, under the column entitled Part No. 94, the part number "7N-9061" is listed 274, and under the column entitled Required Quantity 97, the quantity of one is listed 275 and under the column Part Name 94 the name "RADIATOR GROUP" is listed 276. Preferably, when a consumer clicks on input 272, for example, the required quantity of parts automatically appears inside input 272, without any additional input, to correlate with the quantity listed 275. If the consumer does not need or want the required quantity, he can easily change input 272 by entering the desired quantity.

In the second row in the individual parts portion 87, under the column entitled Reference 88, the designation "2" appears 277, under the column entitled Quantity 90, the input 278 is the numeral "4", under the column entitled Note 92, a designation is not present 279, under the column entitled Part No. 94, the part number "1A-2029" is listed 280, and under the column entitled Required Quantity 97, the quantity of "4" is listed 281 and under the column Part Name 94, the name "BOLT" is listed 282.

In the third row in the individual parts portion 87, under the column entitled Reference 88, the designation "3" appears 283, under the column entitled Quantity 90, the input 284 has no numeral present, under the column entitled Note 92, a designation is not present 285, under the column entitled Part No. 94, the part number "8N-4853" is listed 286, and under the column entitled Required Quantity 97, the quantity of "1" is listed 287 and under the column Part Name 94, the name "GASKET" is listed 288.

In the fourth row in the individual parts portion 87, under the column entitled Reference 88, the designation "4" appears 289, under the column entitled Quantity 90, the input 290 has the numeral "3" present, under the column entitled Note 92, a designation is not present 291, under the column entitled Part No. 94, the part number "0S-0509" is listed 292, and under the column entitled Required Quantity 97, the quantity off "3" is listed 293 and under the column Part Name 94, the name "BOLT" is listed 294.

In the fifth row in the individual parts portion 87, under the column entitled Reference 88, the designation "5" appears 295, under the column entitled Quantity 90, the input 296 has the numeral "9" present, under the column entitled Note 92, a designation is not present 297, under the column entitled Part No. 94, the part number "5M-2894" is listed 298, and under the column entitled Required Quantity 97, the quantity of "9" is listed 299 and under the column Part Name 94, the name "WASHER" is listed 300.

In the sixth and final row illustrated in the individual parts portion 87 of the schematic screen interface 86, under the column entitled Reference 88, the designation "6" appears 301, under the column entitled Quantity 90, the input 302 has no numeral present, under the column entitled Note 92, a designation is not present 303, under the column entitled Part No. 94, the part number "5s-1213" is listed 304, and under the column entitled Required Quantity 97, the quantity of "1" is listed 305 and under the column Part Name 94, the name "PLATE" is listed 306.

When finished making the appropriate selections, the consumer is shown the items he or she has collected in a shopping cart via a shopping cart interface screen 56, as illustrated in FIG. 11. In the preferred embodiment, the shopping cart software application resides on the manufacturer server system 30. The shopping cart application allows the client system 20 to create a parts list 102 for purchasing or inquiring about products on-line. There are five columns of information that include Quantity 90, Serial No. 106, Part No. 94, Part Name 96, and Removal Option 112. Quantity 90 allows the consumer to utilize the previously selected or entered quantity and automatically inputs this value at input 290. Serial No. 106 identifies a specific serial number prefix associated with selected part numbers. Part No. 94 identifies a specific part number in the system and Part Name 96 provides the associated descriptor. Additionally, just as the shopping cart application allows a consumer to add products, it also allows deletion of products from the virtual shopping cart on the manufacturer server system 30 and thus removal links are designated in this fifth column 112.

In the first row in the portion of the shopping cart interface screen 56, under the column entitled Quantity 90, the input 290 has the numeral "3" present, under the column entitled Serial No. 106, an exemplary serial number appears 310, under the column entitled Part No. 94, the part number "0S0509" is listed 292, under the column Part Name 94, the name "BOLT" is listed 294 and under the column Removal 112, a hyperlink Remove 312 is listed that allows the consumer to delete the item from the shopping cart interface screen 56.

In the second row in the portion of the shopping cart interface screen 56, under the column entitled Quantity 90, the input 278 has the numeral "4" present, under the column entitled Serial No. 106, an exemplary serial number appears 314, under the column entitled Part No. 94, the part number "1A2029" is listed 280, under the column Part Name 94, the name "BOLT" is listed 282 and under the column Removal 112, a hyperlink Remove 316 is listed that allows the consumer to delete the item from the shopping cart interface screen 56.

In the third row in the portion of the shopping cart interface screen 56, under the column entitled Quantity 90, the input 296 has the numeral "9" present, under the column entitled Serial No. 106, an exemplary serial number appears 318, under the column entitled Part No. 94, the part number "5M2894" is listed 298, under the column Part Name 94, the name "WASHER" is listed 300 and under the column Removal 112, a hyperlink Remove 320 is listed that allows the consumer to delete the item from the shopping cart interface screen 56.

In the fourth and final row in the portion of the shopping cart interface screen 56, under the column entitled Quantity 90, the input 272 has the numeral "1" present, under the column entitled Serial No. 106, an exemplary serial number appears 322, under the column entitled Part No. 94, the part number "7N9061" is listed 274, under the column Part Name 94, the name "RADIATOR GROUP" is listed 276 and under the column Removal 112, a hyperlink Remove 324 is listed that allows the consumer to delete the item from the shopping cart interface screen 56.

In addition, changes to the contents of the shopping cart 56 can be updated through button 114, the shopping list can be saved through button 116 and the shopping cart can be emptied through button 118. It is also to be understood that in the preferred embodiment, a shopping cart application 56 does not physically reside on the remote dealer server system 40. This is because it is more efficient in terms of cost, real-time accessibility, and convenience, for example, to have the web applications run on the manufacturer server system 30 rather than on the dealer server system 40, as will be explained in more detail below.

Accordingly, once a consumer or user has navigated to the manufacture's website and selected a specific dealer, logged on, and collected in his shopping cart the desired items for inquiry or purchasing, the consumer's web browser can send the requested information over the Internet via Internet connection 25 to the manufacturer server system 30 by selecting the "Price & Availability" link 120, as shown in FIG. 11, for example. Referring again to FIG. 1, the manufacturer server system 30, using the middleware application system 35, then passes the requested information to the consumer-specified dealer server system 40, such as an International Business Machines Corporation's (hereinafter IBM®) AS/400®, for example. IBM® is located at New Orchard Road, Armonk, N.Y. 10504. The dealer server system 40 collects the requested information and returns the results back to the manufacturer server system 30 which sends the results to the consumer's client system 20 via the established Internet connection 25. In this manner, a consumer receives information and purchases items from actual dealers, not directly from the manufacturer. Additionally, this arrangement allows all dealers to have the advantage of publishing their own websites on the manufacturer server system 30 and acquiring consumer information for highly valued consumer relationship marketing purposes. Hereinafter, this process will be described in more detail.

Specifically, together with the manufacturer server system 30 and database 12 is a middleware application system 35 which includes a web application server, such as IBM®'s WebSphere®. The web application server within the middleware application system 35 is used to make connection with a Consumer Terminal Application ("CTA") within the specified dealer server system 40 to enable bi-directional communication during the transaction process, as will be explained in more detail below.

After the consumer has collected in his shopping cart the desired items and is ready to purchase or view detailed information on such parts or items, the consumer will place a quote by selecting the "Price & Availability" link 120, as shown in FIG. 11, and as explained above. As shown in FIG. 1, by placing a quote, a call is made to a servlet (i.e., a small software program) in the web application server within the middleware application system 35. The shopping cart contents and other requested data are then converted into string format (using special characters as delimiters) and are sent to the servlet. The servlet then extracts the data string and passes it to the middleware application system 35 which reads the string to determine which dealer it must connect to. The middleware application system 35, which is implemented using a set of Java classes, that use, for example, IBM®'s Host Access Class Library® ("HACL"), then interacts with the requested dealer server system 40 via the CTA using its web application server. This particular implementation is necessary in order provide real-time dealer specific information to the consumer without interfacing the consumer directly with the older dealer technology.

The middleware application system 35 thus first creates a new data object which is populated with the shopping cart information retrieved from the passed string. After reading the string, the middleware application system 35 connects to the specified dealer server system 40 and creates and maintains a session between the particular dealer server system 40 and the middleware application system 35, as explain previously. Again, this connection or session is made using IBM® HACL® technology, for example, which uses telnet to connect to the dealer server system 40 which provides an application program interface ("API") that enables screen recognition and screen interaction (i.e., reading/writing/keystroke entry) between the consumer and CTA without the consumer being exposed to such older, less user-friendly "green screens." More particularly, by sending only the requested information to the dealer server system 40, rather than interfacing directly with the dealer server system 40, the consumer takes advantage of real-time dealer server system data without being exposed to the dealer server system 40 "green screens" and without exposing the dealer server system 40 to any direct and prolonged Internet connections with the client system 20. An Internet connection 25 is only made from the web application server within the middleware application system 35 to the dealer server system 40 after the consumer has successfully logged onto the virtual dealer store. Thus, the centralized manufacturer server system configuration allows for dealer control and security over its virtual store and dealer server system 40. This design minimizes the communication overhead between the manufacturer server system 30 and the middleware application system 35 because the middleware application system 35 performs a set of operations that do not require direct interaction with the consumer.

After the information transfer is complete, the middleware application system 35 converts the data object into a string and returns this string to the calling servlet. The servlet then streams the string back to the manufacturer server system 30 which parses the string and gathers the information, such as availability, descriptions and pricing, and uses such information to display the next page on the web browser of the consumer's client system 20, as shown in FIG. 12 on the "Parts List—Pricing and Availability" interface screen that is generally indicated by 330. In summary, then, once a quote is requested by a consumer, the middleware application system 35 navigates through a set of screens in CTA, inputs the items, reads pricing, dealer-level inventory, and other data and returns this detailed dealer information to the consumer with a quote number for tracking the particular consumer's request in the event an order is placed by the consumer. On the "Parts List—Pricing and Availability" interface screen 330, there is a portion dedicated to Order Details 332 including a consumer identification number 334, a tracking serial number 336, and a quote number 338. There is a section providing notes 340 regarding the order and an e-mail hyperlink 342 that allows orders to be placed with special instructions. There is a "Parts List" that is generally indicated by numeral 344 with seven columns of information that include a Serial No. 106, Part No. 94, Quantity 90, Part Name 96, Availability 346, Unit Price 348 and Price 350. Serial No. 106 identifies a specific serial number prefix associated with selected part numbers. Part No. 94 identifies a specific part number in the system. Quantity 90 allows the consumer to utilize the previously selected desired quantity and automatically inputs this value. Part Name 96 provides the associated descriptor associated with each part number. Availability 346 provides valuable information on how long it will take to obtain a part and the location of the source of the part. Unit Price 348 will provide a cost per unit and Price 350 provides the aggregate price for the specified quantity of parts.

In the first row in the portion of the "Parts List" 344, under the column entitled Serial No. 106, the exemplary serial number is blank 310, under the column entitled Part No. 94, the part number "0S-0509" is listed 292, under the column Quantity 90, the input 290 has the numeral "3" present, under the column Part Name 96, the name "BOLT" is listed 294 and under the column Availability 346, the designation "Peoria—1 day" 352 is present, under the column entitled Unit Price 348, a unit price of $5.60 is present 354, and under the column designated Price 350, an aggregate price of $16.80 is present 356.

In the second row in the portion of the "Parts List" 344, under the column entitled Serial No. 106, the exemplary serial number is blank 314, under the column entitled Part No. 94, the part number "1A-2029" is listed 280, under the column Quantity 90, the input 278 has the numeral "4" present, under the column Part Name 96, the name "BOLT" is listed 282 and under the column Availability 346, the designation "Moline—1 day" 358 is present, under the column entitled Unit Price 348, a unit price of $64.81 is present 360, and under the column designated Price 350, an aggregate price of $259.24 is present 362.

In the third row in the portion of the "Parts List" 344, under the column entitled Serial No. 106, the exemplary serial number is blank 318, under the column entitled Part No. 94, the part number "5M-2894" is listed 298, under the column Quantity 90, the input 296 has the numeral "9" present, under the column Part Name 96, the name "WASHER" is listed 300 and under the column Availability 346, the designation "Moline—1 day" 364 is present, under the column entitled Unit Price 348, a unit price of $2.49 is present 366, and under the column designated Price 350, an aggregate price of $22.41 is present 368.

In the fourth and final row in the portion of the "Parts List" 344, under the column entitled Serial No. 106, the exemplary serial number is blank 322, under the column entitled Part No. 94, the part number "7N-9061" is listed 274, under the column Quantity 90, the input 272 has the numeral "1" present, under the column Part Name 96, the name "RADIATOR GROUP" is listed 276 and under the column Availability 346, the designation "Peoria—1 day" 370 is present, under the column entitled Unit Price 348, a unit price of $264.81 is present 372, and under the column designated Price 350, an aggregate price of $264.81 is present 374.

The total cost for all parts on the price list is tallied and generally indicated by numeral 375.

After the requested detailed dealer information and quote number are sent to the client system 20 and displayed, as shown in FIG. 12, the consumer may choose to continue to place an order by selecting the "Continue" button 377. The order can also be cancelled by selecting the "Cancel Order" button 376. If an order is placed, the consumer is directed to the next page by the web browser of the consumer's client system 20, as shown in FIG. 13 on the "Order Summary" interface screen that is generally indicated by 380. On this "Order Summary" interface screen 380, there is a portion dedicated to Order Details 332 including a quote number 338, consumer identification number 334, a tracking serial number 336, and a purchase order number 384. The new item not present on the preceding "Parts List—Pricing and Availability" screen 330 is the purchase order number 384 that is generated in conjunction with this specific transaction. As before, there is a "Parts List" that is generally indicated by numeral 344 with seven columns of information that include a Serial No. 106, Part No. 94, Quantity 90, Part Name 96, Availability 346, Unit Price 348 and Price 350 with the same four rows of information as found on the preceding "Parts List—Pricing and Availability" screen 330. The shipping details are generally indicated by numeral 386 with a detailed shipping address 387 and detailed shipping instructions 388. The notes 340 are again replicated from the preceding interface screen 330.

Figure 14:
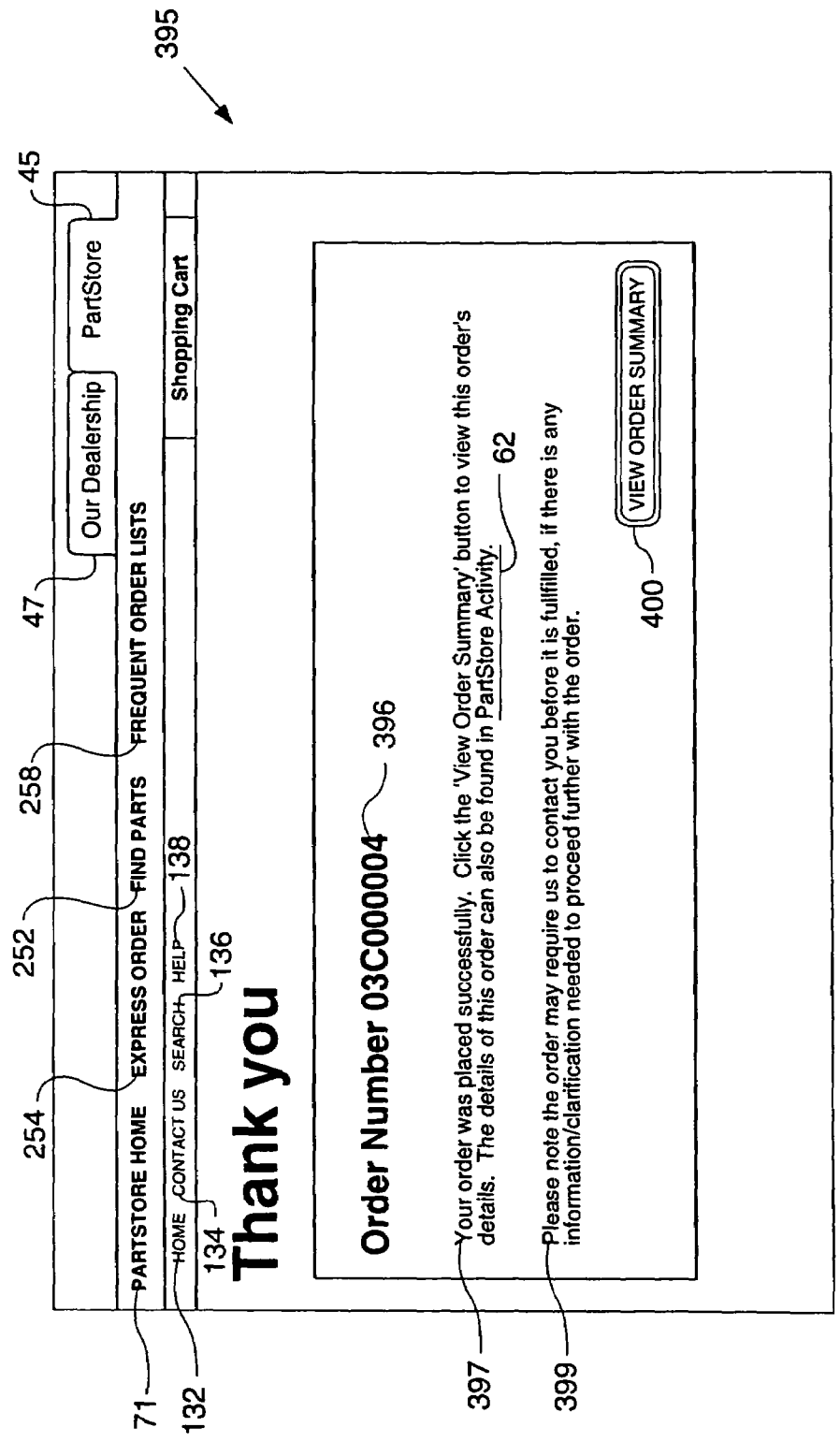
FIG. 14 illustrates a "thank you" screen for expressing appreciation to the consumer for ordering parts from the dealer.

The consumer may choose to actually place an order by selecting the "Place Order" button 390 or the order can also be cancelled by selecting the "Cancel Order" button 376. If an order is placed, the consumer is directed to the final page of the systemization method by the web browser of the consumer's client system 20, as shown in FIG. 14 on the "Thank You" interface screen that is generally indicated by 395. This includes an order number 396 which is the same as the quote number 338 with a capital "C" replacing a capital "Q" within the number. There is verbiage explaining that the order was placed successfully 397 with a hyperlink 62 to Part Store activity. The next verbiage is to notify the consumer that additional information may be required 399. There is then a hyperlink entitled "View Order Summary" 400 that can return the consumer to the preceding "Order Summary" interface screen 380 in order for the consumer to review a summary of his or her purchase.

It is understood that other details regarding the placement of an order at the dealer server system 40 using the quote number have been omitted so as to not obscure the present invention.

As explained above, the present invention's centralized manufacturer server system arrangement allows a consumer access to real-time detailed dealer information from a particular dealer server system 40 among multiple dealer systems twenty-four hours a day, seven days a week, thereby offering robust information and purchasing capabilities without interfacing a consumer directly with older dealer technology and systems. Detailed dealer information preferably includes such information as dealer-level inventory, pricing, and sales information, for example. If this information were stored on the manufacturer server system 30 or database 12, real-time data from numerous dealer databases would have to be consistently accessed and synchronized to the manufacturer server system 30 and database 12 costing exponentially more than the present invention in terms of mandatory upgrading of dealer systems and increased maintenance and delay times of the virtual storefront. Hence, with the centralized management server system arrangement of the present invention, dealers are freed from the burden of having to buy additional servers, worry about connections, security, or maintenance issues associated with creating an individual dealer web server environment. Furthermore, the present invention's method of providing a systemization of machine parts to a consumer allows for easy, accurate, convenient, and quick selection of machine parts. This enables a consumer to order and inquire about parts without undue confusion or unnecessary delay.

While certain features of the invention have been illustrated as described herein, many modifications, changes and equivalents will now occur to those skilled in the art. It is, therefore, to be understood that the appended claims, are intended to cover all such modifications and changes as fall within the true spirit of the invention. It is also preferred that the present invention be limited not by the specific disclosure herein, but by the scope of the appended claims.

Industrial Applicability

The present invention is advantageously applicable in providing an e-commerce virtual store system, via a centralized manufacturer server system arrangement, to a consumer with the ability to view real-time dealer level inventory, product descriptions, pricing, as well as purchase products electronically in a reduced dealer cost, increased dealer security, increased dealer control, and in a low-maintenance manner for the dealer. In addition, the e-commerce virtual store system, via a systemization of machine parts, allows a consumer to efficiently select and assemble machine parts. Consequently, a dealer can efficiently provide a consumer with organized and valuable product information in addition to purchasing capabilities without having to make extensive back-end upgrades in terms of equipment, security, or maintenance while still retaining complete control over web site content and consumer relationship marketing.

Other aspects, objects and advantages of the present invention can be obtained from a study of the drawings, the disclosure and the appended claims.

The invention claimed is:

1. An e-commerce based method of providing a systemization of machine parts to a consumer, said method comprising the steps of:
   collecting, via a computer system, information from said consumer regarding a machine;
   selecting a system of machine parts from at least two available systems of machine parts, wherein each of said available systems includes at least two available components of machine parts; and
   wherein said selected group of machine parts is selected from at least two different groups of machine parts;
   selecting a component of machine parts from said selected system parts, wherein each of said available components includes at least one group of machine parts and said at least one group of machine parts comprises at least one individual part of machine parts;
   providing said consumer with a first option of purchasing said at least one group of machine parts entirely and a second option of separately purchasing said at least one individual part of machine parts;
   selecting a group of machine parts from said selected component of machine parts, and wherein each of said at least two available systems, said at least two available components, and said at least one group, are adapted to correspond to machine parts within said machine; and
   providing information to said consumer via said computer system regarding machine parts included in said selected system of machine parts, said selected component of machine parts, and said selected group of machine parts.

2. The e-commerce based method of claim 1, wherein collecting information from said consumer includes collecting product, model, and configuration information for said machine.

3. An e-commerce based method of providing a systemization of machine parts to a consumer, said method comprising:
   collecting, via a computer system, information from said consumer regarding a machine;
   selecting a system of machine parts from at least two available systems of machine parts, wherein each of said available systems includes at least two different components of machine parts, each of said at least two different components includes at least two different groups of machine parts, and each of said at least two different groups is comprised of at least one individual part of machine parts;
   providing said consumer with a first option of purchasing at least one of said at least two different groups of machine parts entirely and a second option of separately purchasing said at least one individual part of machine parts;
   selecting a component of machine parts from said at least two different components;
   selecting a group of machine parts from said at least two different groups;
   selecting an individual part of machine parts from said at least one individual part, and wherein each of said at least two available systems, said at least two different components, said at least two different groups, and said at least one individual part, are adapted to correspond to machine parts within said machine; and
   providing information to said consumer via said computer system regarding machine parts which make up said selected system of machine parts, said selected component of machine parts, said selected group of machine parts, and said selected individual part of machine parts.

4. The e-commerce based method of claim 3, wherein collecting information from said consumer includes collecting a product, model, and configuration, for said machine.

5. The e-commerce based method of claim 1, wherein providing information to said consumer includes displaying a graphic of said selected group of machine parts.

6. The e-commerce based method of claim 5, wherein displaying said graphic includes displaying at least one individual part of machine parts in said selected group of machine parts.

7. The e-commerce based method of claim 5, wherein providing information to said consumer includes displaying a list with said graphic, said list including at least one of a group identifier identifying said selected group of machine parts, and an individual part identifier identifying at least one individual part of machine parts in said selected group of machine parts.

8. The e-commerce based method of claim 7, wherein providing information to said consumer includes displaying one or more reference numerals on said graphic that correspond to one or more reference numerals on said list.

9. The e-commerce based method of claim 3, wherein providing information to said consumer includes displaying a graphic of said selected group of machine parts.

10. The e-commerce based method of claim 9, wherein providing information to said consumer includes displaying a list with said graphic, said list including a group identifier identifying said selected group of machine parts.

11. The e-commerce based method of claim 3, wherein providing information to said consumer includes displaying a graphic of said selected individual part of machine parts.

12. The e-commerce based method of claim 11, wherein providing information to said consumer includes displaying a list with said graphic, said list including an individual part identifier identifying said selected individual part of machine parts.

13. An e-commerce based system for providing a systemization of machine parts to a consumer, the system comprising:
- a manufacturer server hosting a manufacturer's web site and a plurality of dealer's web sites, the manufacturer server being operably connected to a plurality of dealer server systems via an intermediate web application server, the manufacturer server being operable to:
- collect information from the consumer regarding a machine, identify one or more systems of machine parts in the machine, identify one or more components of machine parts in the one or more systems, identify one or more groups of machine parts in the one or more components, receive a selection of:
- one of the one or more systems of machine parts, one of the one or more components of machine parts, and one of the one or more groups of machine parts, from the consumer; and
- provide information to the consumer, from at least one of the plurality of dealer server systems via the web application server, regarding machine parts included in the selected one of the one or more systems of machine parts, the selected one of the one or more components of machine parts, and the selected one of the one or more selected groups of machine parts, wherein said selected group of machine parts is selected from at least two different groups of machine parts without interfacing the consumer directly the at least one dealer server system.

14. The e-commerce based system of claim 13, wherein the manufacturer server is further operable to identify one or more individual parts of machine parts in the one or more groups of machine parts.

15. The e-commerce based system of claim 14, wherein the manufacturer server is further operable to receive a selection of one of the one or more individual parts of machine parts from the consumer.

16. The e-commerce based system of claim 15, wherein the manufacturer server is further operable to provide information to the consumer by displaying a graphic of the selected one of the one or more individual parts of machine parts.

17. The e-commerce based system of claim 13, wherein the manufacturer server is further operable to provide information to the consumer by displaying a graphic of the selected one of the one or more groups of machine parts.

18. The e-commerce based system of claim 17, wherein the manufacturer server is further operable to provide information to the consumer by displaying a list of machine parts in the graphic.

19. The e-commerce based system of claim 18, wherein the manufacturer server is further operable to display one or more reference numerals on the list that correspond to one or more reference numerals on the graphic.

20. The e-commerce based system of claim 19, wherein the manufacturer server is further operable to allow the consumer to compose an order for machine parts by selecting machine parts from the list.

21. The method of claim 1, further comprising displaying a plurality of machine configuration types based on the information collected from the consumer, and receiving, from the consumer, a selection of one of the displayed configuration types.

22. The method of claim 1, wherein the selected system of machine parts comprises a system of the machine, the selected system being carried by the machine and configured to perform a machine operation.

23. The method of claim 1, wherein said selected group of machine parts includes a unique identifier indicative of said selected group, whereby the consumer can identify said selected group via the identifier.

24. The method of claim 3, wherein said selected group of machine parts includes a unique identifier indicative of said selected group, whereby the consumer can identify said selected group via the identifier.

* * * * *